United States Patent

Sevag

[15] 3,689,646

[45] Sept. 5, 1972

[54] ANTIMUTAGENIC TREATMENT OF BACTERIA

[72] Inventor: Manasseh G. Sevag, Newtown Square, Pa.

[73] Assignee: The Trustees of the University of Pennsylvania

[22] Filed: Sept. 4, 1969

[21] Appl. No.: 871,019

Related U.S. Application Data

[60] Division of Ser. No. 576,566, Sept. 1, 1969, abandoned, which is a continuation-in-part of Ser. No. 297,200, July 24, 1963, abandoned, and a continuation-in-part of Ser. No. 355,480, March 27, 1964, abandoned.

[52] U.S. Cl. .................424/181, 424/227, 424/228, 424/229, 424/257
[51] Int. Cl. .......................A61k 21/00, A61k 27/00
[58] Field of Search.......424/257, 229, 228, 227, 181

[56] References Cited

UNITED STATES PATENTS 2,579,185   12/1951   Granatek................260/239.1

Primary Examiner—Sam Rosen
Attorney—Paul & Paul

[57] ABSTRACT

This invention is concerned with a method of killing bacteria with a bactericide so as not to inherently produce bacteria strains resistant to the bactericide. In the method of this invention, the bactericide is utilized along with an effective amount of an antimutagenic agent such as spermine, spermidine, quinacrine hydrochloride, chlorpromazine, promethazine, levomepromazine, cyclobenzaprine, 3-chlorodibenzocycloheptene, protriptyline, amitriptyline, azepine hydrochloride and imipramine.

9 Claims, No Drawings

ANTIMUTAGENIC TREATMENT OF BACTERIA

This application is a divisional application filed under Rule 147 of application Ser. No. 576,566 filed Sept. 1, 1969, now abandoned which in turn was partly a continuation-in-part of application Ser. No. 297,200, filed July 24, 1963 now abandoned; and a continuation-in-part of application Ser. No. 355,480, filed March 27, 1964 now abandoned.

This invention relates to a method for preventing the development of mutant strains of bacteria, and to bactericidal compositions containing antimutagenic agents.

One of the major problems presented in attempting to control and eliminate developments of *Staphylococcus aureus*, *Aerobacter aerogenes* and *Escherichia coli*, for example, is the emergence of drug-resistant populations of such bacteria. When *Staphylococcus aureus* is treated with limited dosages of streptomycin, an antibiotic, mutation gradually occurs and resistant strains of *Staphylococcus aureus* develop, which strains become progressively more resistant to repeated treatments with streptomycin. Thus, unless a massive dosage of streptomycin is applied at the outset, which completely eliminates all bacteria at once, control of the bacteria by contact treatment with streptomycin soon becomes impossible. Similar problems are encountered in treating these bacteria with other bactericidal agents, such as ultra-violet radiations.

Even when massive drug dosages are utilized in hospitals upon discovery of an outbreak of *Staphylococcus aureus*, for example, the application of the drug does not usually suffice to eliminate the bacteria entirely, and subsequent mutatory growth which produces drug-resistant strains renders the problem of control an extremely serious one. Similar problems exist with *Aerobacter aerogenes*, *Escherichia coli* and with other bacteria.

Accordingly it is an object of this invention to provide a composition and method for controlling bacteria wherein the emergence of such drug-resistant strains is prevented. Other objects and advantages of this invention will become apparent in further detail hereinafter.

It has now been discovered that the development of mutant populations of bacteria from various strains of gram-positive bacteria such as *Staphylococcus aureus* and gram-negative bacteria such as *Aerobacter aerogenes*, *Escherichia coli* and other bacteria is prevented by incorporating into the growth system an antimutagenic agent selected from the group consisting of spermine, spermidine, quinacrine hydrochloride, chlorpromazine, promethazine, levomepromazine, cyclobenzaprine, 3-chlorodibenzocycloheptene, protriptyline, amitriptyline, azepine hydrochloride and imipramine.

It is believed that the antimutagenic agent cooperates to reduce bacteria to a common status, or common denominator, thereby preventing mutation. To demonstrate this, a series of tests was run. These tests have led me to believe that the antimutagenic agents of this invention combine with the nucleic acids which are the heredity factors in the bacteria, and that these then become resistant to change. In this manner, the tendency to produce mutant strains is eliminated.

These tests are exemplified by Example 1, as follows:

EXAMPLE 1

Various solutions in distilled water contained in dialysis bags were prepared (in duplicate) as follows:

| System | Contents of Dialysis Bag |
|---|---|
| 1 | 10 ml. spermine in distilled water 500 g/ml |
| 2 | 10 ml. DNA in distilled water 500 g/ml |
| 3 | 10 ml. spermine + DNA in distilled 500 g/ml each. |

Each system in individual bags was suspended in 20 ml. of distilled water as outside fluid, and each system was housed within an individual stoppered bottle to prevent evaporation. Aliquots were taken out at 1, 2, 3, 4, 5 and 22 hour periods and analyzed for the spermine content using the colorimetric ninhydrin method. Systems 1 and 2 remained clear and complete dialysis of spermine occurred. System 3 was observably turbid, and quantitative analysis showed that 950 g of spermine had complexed with DNA. It will be appreciated that when mutant strains are developed in the absence of an antimutagenic agent, some of the mutant strains are more resistant and some are less resistant to the repeated action of a bactericidal agent, but the resistant strains nevertheless survive. Thus, if mutant-resistant strains are already in existence, the application of spermine in conjunction with the bactericidal agent cannot convert the resistant strains back to non-resistant strains, but if no resistant strains are initially present, spermine or spermidine in combination with the bactericidal agent effectively prevents the development of resistant strains and therefore renders the bactericidal agent fully effective. This property is particularly valuable in hospitals and in other areas where resistant strains have a tendency to develop. Where strains have developed which are resistant to only one drug or other bactericidal agent, for example streptomycin, then these resistant strains can nevertheless be treated successfully with another such agent, i.e. penicillin combined with an antimutagenic agent.

It has also been found that since a bacterial strain which has become resistant to one particular bactericidal agent has a pronounced tendency to become resistant to others causing a real danger that a resistant strain will be developed during testing with a second or third antibiotic, this invention has special utility in laboratory pre-testing of bacteria to determine which antibiotics will be effective treating agents. The danger of emergence of strains resistant to more than one bactericidal agent is eliminated by incorporating spermine or spermidine with the antibiotics used in the test to which the organism is sensitive. Otherwise, even with a massive dosage of a bactericidal agent, resistant bacteria may develop.

While *Staphylococcus aureus* and *Aerobacter aerogenes* or *Escherichia coli* have been referred to specifically herein, this invention is not restricted to the control of these organisms but applies broadly to the gram-positive and gram-negative bacteria of which these are representative.

In accordance with an embodiment of this invention, an organism such as *Staphylococcus aureus* or Aerobacter aerogenes, cultured naturally or in a synthetic medium, is treated with a sterile solution of any one of the specific bactericidal agents heretofore referred to, such solutions preferably being in distilled water. Spermine or spermine phosphate (or spermidine or spermidine phosphate) solutions are sterilized by filtration through Millipore disc filters. Repeated applications of such solutions, coadministered with the antibiotic in accordance with this invention, result in a complete elimination of the bacteria. Streptomycin-spermine solutions are preferably administered by injection, while penicillin-spermine solutions may be administered by injection or orally. The methods of administering these and other antibiotics are determined by the preferred method of administering the antibiotic along.

In accordance with this invention, sterile solutions of the antibiotics and distilled water are used, and the spermine or spermidine may be incorporated into this solution either as such or in any other desired form such as the phosphates, in an amount of about 10–100 micrograms per milliliter.

Spermine has the formula $H_2NCH_2)_2(CH_2HN-CH_2(CH_2)_3NH(CH_2)_2CH_2NH_2$. Spermidine is a shorter chain polyamine and has the following formula: $H_2NCH_2(CHC2)_2NH(CH_2)_3CH_2NH_2$. These compounds may be utilized per se or as the phosphates, in which form they occur naturally.

EXAMPLE 2

A growth medium was prepared consisting of Staphylococcus aureus (3A) and this was cultured in a synthetic growth medium containing 16 amino acids, vitamins and salts. The growth medium was in accordance with the disclosure of Steers and Sevag, Arch Biochem. 24, 129 (1949). Two H. Staph. aureus strains were grown in extract broth containing 0.5 percent glucose, and A. aerogenes in a minimal salts-glucose medium according to the method of Drabble and Hinshelwood, Sir Cyril Roy. Soc. (B) 154, 449 (1961).

An inoculum containing from 1 to $2 \times 10_8$ cells was added to 5 ml. of the appropriate liquid medium in a 14 × 120 mm. test tube. For the staphylococcal strains the inoculated cells were taken from the second daily transplant on extract agar from the stock culture. These cells were suspended in a 1/15 molar phosphate buffer at a pH of 7.34. Cells of A. aerogenes taken from the stock culture were grown twice in salts-glucose medium and washed in a phosphate buffer solution having a pH of 7.1 before use.

All cultures were incubated at 37° C. Growth was followed by measuring the increase in turbidity using a Klett-Summerson photoelectric colorimeter with filter No. 56. The instrument was calibrated against viable plate count and microscopic count for each strain. Sterile solutions of the antibiotics in distilled water were used. Spermine or spermine phosphate solutions were sterilized by filtration through Millipore disc filters. For colony counts, pour plates were prepared from the synthetic amino acid medium supplemented with 1.5 percent agar were incubated at 37° C.

The results with respect to various strains of S. aureus (3A) in media containing spermine, streptomycin and spermine plus streptomycin appear in the following table.

TABLE 1

Prevention of the Emergence of Drug-Resistant Cells from the Drug-Sensitive Population of Staphylococcus aureus (3A) in the Combined Presence of Spermine and Streptomycin, and Their Failure to Affect the Growth of the Streptomycin-resistant Strain

| Growth System | Drug-Sensitive Normal Strain | Drug-Sensitive strain after 6 subcultures in Spermine 100 micrograms/ml | Drug-Sensitive strain* after one subculture in Streptomycin 100 micrograms/ml |
|---|---|---|---|
| | Growth Turbidity Readings at Hours of: | | |
| Additions | 0  5 28 36 46>1000 | 18  42>1000 | 8  27  47 |
| None | 10  20260 | 18  315 | 10  86  305 |
| Spermine (100 micrograms/ml | 13  18188 | 20  246 | 18  18  81  224 |
| Strepto-(100 micrograms/ml | 13  16 27 37  200 | 18  27  276 | 15  48  260 |
| Spermine + Strepto-(each 100 micrograms/ml | 15  16 21 17  18  1420 | 27  28  2410 | 14  38  245 |

*Similarly, the combined presence of spermine and streptomycin had no effect on the growth of the normal strain after 4 sub-cultures in streptomycin followed by 6 subcultures in spermine.

From the foregoing table it will be apparent that spermine alone has little or no delaying action on the growth of these three strains. In streptomycin, the resistant strain grows readily and even the sensitive strains produce resistant cultures within 46 hours. The growth of cells which are initially fully resistant is not affected by the combined presence of spermine and streptomycin, just one subculture in streptomycin being sufficient to render the cells resistant to this combination. On the other hand, cultures of the sensitive strain are prevented from developing into a resistant population when spermine is present. Even spermine-grown cells are inhibited by spermine and streptomycin administered together.

Tests with A. aerogenes yielded results similar to those with S. aureus (3A).

The foregoing results show that spermine itself does not exercise a bactericidal action. If it had exerted a bactericidal action the viable count of a sensitive inoculant could be sufficiently reduced to deplete the population of resistant mutants. Viable colony counts, however, showed that S. aureus growing in 10 micrograms of spermine per ml. alone were not killed but multiplied 26-fold in a 9 hour growth period. When growing in 100 micrograms of spermine per ml. there was first a 9 hour lag with no increase or reduction in viable count, followed by a 30-fold increase during the second 9 hours. This confirms the fact that spermine itself does not exercise a bactericidal action.

EXAMPLE 3

A mixture of a small number of cells of A. aerogenes resistant to streptomycin (2 cells) and $0.57 \times 10_8$ sensitive cells was used as the inoculum. This readily yielded a resistant population in the combined presence of spermine and streptomycin. However, sensitive cells alone, with no resistant cells added, failed to develop in this medium, as appears in the following table.

TABLE 2

Failure of the Emergence of Streptomycin-resistant Bacteria from Sensitive Inoculum and the Ready Emergence of Resistant Bacterial Population when only 2 Resistant Cells were added to the Inoculum Containing $0.57 \times 10_8$ Sensitive Cells/5 ml. Medium

| Growth System Additions | Drug-Sensitive Normal Strain Growth Turbidity Readings at Hours of: | | | | Drug-Sensitive Cells Few Resistant Cells | | |
|---|---|---|---|---|---|---|---|
| | 0 | 23 | 47 | 73 | 0 | 23 | 47 |
| None | 15 | 138 | 146 | – | 16 | 138 | 145 |
| Streptomycin 100 micrograms/ml. | 15 | 94 | 107 | – | 15 | 109 | 150 |
| Spermine 100 micrograms/ml. | 15 | 126 | 140 | – | 15 | 122 | 147 |
| Streptomycin + spermine | | | | | | | |
| spermine | 15 | 14 | 14 | 14 | 15 | 122 | 175 |

The foregoing illustration confirms the fact that cultures of the sensitive strain do not contain any of the resistant culture, since otherwise such resistant cells would selectively multiply and yield a drug-resistant population even in the combined presence of spermine and the antibiotic.

EXAMPLE 4

The following table shows the results obtained in testing the penicillin-sensitive hospital strain of *Staphylococcus aureus*.

TABLE 3

Prevention of the Emergence of Drug-resistant Cells from Penicillin-sensitive and Penicillin-resistant Strains of *Staphylococcus aureus* in the Combined Presence of Spermine and Penicillin or Streptomycin

| Growth System Additions | Staphylococcal Strains | Growth Turbidity Readings at Hours of: | | | | | |
|---|---|---|---|---|---|---|---|
| | | 0 | 21 | 44 | 68 | 91 | 163 |
| None | Sensitive to Penicillin (# 1357) | 24 | 61 | 161 | 232 | | |
| Spermine (100 micro-grams/ml.) | | 24 | 54 | 70 | 90 | 105 | 132 |
| Penicillin (0.1 unit/ml.) | | 24 | 46 | 89 | 112 | 110 | 123 |
| Penicillin (0.1 unit/ml.)+spermine (100 micrograms/ml.) | | 27 | 31 | 31 | 31 | 30 | 33 |
| None | Resistant to Penicillin (# 1360) | 21 | 71 | 218 | | | |
| Spermine (100 micro-grams/ml.) | | 19 | 54 | 144 | 200 | | |
| Penicillin (1 unit/ml.) | | 23 | 63 | 265 | | | |
| Penicillin (1 unit/ml.) + Spermine (100 micrograms/ml.) | | 21 | 40 | 137 | 232 | | |
| None | Resistant to Penicillin (# 1360) | 25 | 105 | 310 | | | |
| Spermine (100 micro-grams/ml.) | | 25 | 72 | 162 | 276 | | |
| Streptomycin (50 micrograms/ml.) | | 24 | 25 | 32 | 93 | 310 | |
| Streptomycin (50 micrograms/ml.) + Spermine (100 micro-grams/ml.) | | 22 | 26 | 28 | 35 | 30 | 31 |

This strain was prevented from emerging as penicillin-resistant in the presence of both spermine and 0.1 unit of penicillin per ml. While the resistant hospital strain of *Staphylococcus aureus* grew readily in a combination of spermine and penicillin, it was completely prevented from yielding a population resistant to 50 micrograms of streptomycin per ml. in combination with spermine.

Many tests were run to determine the minimal effective doses for *Staphylococcus aureus* (3A). These showed that 10 micrograms of spermine per ml. together with 100 micrograms of streptomycin per ml. prevented the emergence of resistant cells. 50 micrograms of streptomycin with 100 micrograms of spermine per ml. produced the same effect on the penicillin-resistant hospital strain of *Staphylococcus aureus*. Obviously, the quantities of spermine and spermidine and phosphates thereof will be found to vary beyond the range of 10–100 micrograms per ml. depending upon the bacteria involved, but the polyamine must be present in any event in an amount sufficient to eliminate and to prevent emergence of resistant cells.

Similar results are obtained when bactericidal means other than antibiotics are utilized for killing the bacteria. For example, ultra-violet irradiation of cultures, utilized in conjunction with cells which were pre-incubated with 100 micrograms of spermine per ml. for 40 minutes, produced a viable count of cultures which was approximately 170 times less than the cultures similarly treated with ultra-violet light, spermine having been omitted. Accordingly, it will be appreciated that the essence of the invention resides in treating the bacterial medium with spermine prior to the time that the medium is affected by the killing agent which may be of the aforementioned antibiotics or even ultra-violet light as well.

In view of the foregoing disclosure, it will be appreciated that spermine or spermidine in combination with streptomycin, penicillin, erythromycin, tetracycline of chlorampenicol, or utilized in conjunction with ultra-violet light, can completely prevent the emergence from sensitive cells of populations which are resistant to ghe drugs or to the ultra-violet light. This effect is not comparable to the usual synergism between two drugs acting together, since spermine or spermidine alone fails to have any bactericidal action on the strains tested and small numbers of resistant cells can survive in a medium containing both spermine and antibiotic. Spermine is believed to intervene during development of the resistance mechanism, but cells which are already fully resistant are unaffected by the presence of the spermine.

In accordance with an embodiments of this invention, an organism such as *Staphylococcus aureus* or *Eschericia coli*, cultured naturally or in a synthetic medium, is treated with a sterile solution of any one of the specific bactericidal agents heretofore referred to, in combination with quinacrine hydrochloride, such solutions preferably being in distilled water. Repeated applications of such solutions, coadministered in accordance with this invention, results in a complete elimination of the bacteria. Streptomycin-quinacrine hydrochloride solutions are preferably administered by injection, while penicillin-quinacrine hydrochloride solutions may be administered by injection or orally.

Quinacrine hydrochloride has the empirical formula $C_{23}H_{30}Cl\ N_3O\cdot 2H\ Cl\cdot 2H_2O$ and a molecular weight of 508.91. Its structural formula can be characterized as:

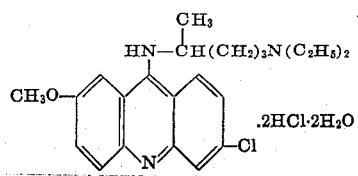

The pharmacology of quinacrine hydrochloride is well known. It is widely used clinically in the treatment of malaria and is administered in dosages as high as one gram per day without adverse effects. The dosage effective for administration to human patients according to this invention in combination with bactericidal agents will generally be considerably less than 1 gram per day.

EXAMPLE 5

A culture of *Escherichia coli* (strain B) prepared in a synthetic growth medium, $2 \times 10^8$ cells per 5 milliliter of salts-glucose casein hydrolyzate, and incubated at 37° C was tested. The growth progress of the culture was determined by measuring the increase in the turbidity of the medium using a Klett-Summerson photoelectric colorimeter equipped with a number 56 filter. The instrument was calibrated against viable plate count and microscopic count for each strain. Sterile solutions of the antibiotics in distilled water were used. Solutions of quinacrine hydrochloride were sterilized by filtration through Millipore disc filters. For colony counts, pour plates were prepared from the synthetic medium supplemented with 1.5 percent agar and incubated at 37° C.

TABLE 4

Prevention of the Emergence of Drug-Resistant Cells from the Normal Strain of *Escherichia coli* (Strain B) in the Combined Presence of Streptomycin and Quinacrine Hydrochloride.

Inoculum: $2 \times 10^8$ cells/5 ml of salts glucose casein hydrolyzate medium.*

| Growth System Additions numbers in micrograms micrograms at Hours of: per milliliter | Growth Turbidity Readings | | | |
|---|---|---|---|---|
| | 0 | 21 | 45 | 117 |
| None | 7 | 167 | | |
| Streptomycin, 10 | 13 | 143 | | |
| Streptomycin, 20 | 13 | 100 | 163 | |
| Streptomycin, 30 | 8 | 23 | 162 | |
| Streptomycin, 50 | 8 | 8 | 8 | 8 |
| Quinacrine Hydrochloride, 40 | 11 | 98 | 156 | 150 |
| Streptomycin, 10 and quinacrine Hydrochloride, 40 | 9 | 6 | 6 | 4 |
| Streptomycin, 20 and Quinacrine Hydrochloride, 40 | 8 | 7 | 5 | 5 |
| Streptomycin, 30 and Quinacrine Hydrochloride, 40 | 15 | 14 | 16 | 15 |

The results presented in Table 4 show that *Escherichia coli* (strain B) capable of yielding resistant strains in the presence of 10, 20 or 30 micrograms per milliliter of streptomycin and unaffected by 40 micrograms per milliliter of quinacrine hydrochloride alone, showed a remarkable resistance to the growth of such strains in the presence of small concentrations of streptomycin (10 micrograms per milliliter) and quinacrine hydrochloride (40 micrograms per milliliter) together. It should be appreciated that the figures in Table 4 for the combination of quinacrine hydrochloride and streptomycin represent no growth whatever as confirmed by pour plate analysis. The medium acquires a natural darkening with age independent of the turbidity measurements and the colorimeter was not re-zeroed for this darkening phenomenon. The results are highly significant when it is appreciated that the synthetic medium is capable of producing growth of the observed very high order of magnitude. It should also be noted that the quinacrine hydrochloride by itself exerts no bactericidal action. When the growth turbidity readings at 28 hours are compared for inoculum in the growth medium without additions and for inoculum in the growth medium with 40 micrograms per milliliter of quinacrine hydrochloride added, the growth in both cases reached the same order of magnitude.

EXAMPLE 6

Table 5 demonstrates that the combination of 100 micrograms per milliliter of streptomycin and 50 micrograms per milliliter of quinacrine hydrochloride prevented the emergence of a staphylococcal strain capable of developing resistance to streptomycin alone and unaffected by treatment with quinacrine hydrochloride alone.

TABLE 5

Prevention of the Emergence of Drug-Resistant Cells from the Normal Strain of *Staphylococcus aureus* (strain 3A) in the Combined Presence of Streptomycin and Quinacrine Hydrochloride.

Inoculum:
$1.0 \times 10^8$ cells/5 ml of 0.5% glucose nutrient broth. The washed inoculum was harvested from an overnight culture grown in the same medium.

| Growth System Additions numbers in micrograms per milliliter | Growth Turbidity Readings at Hours of: | | | |
|---|---|---|---|---|
| | 0 24 | 28 | 70 | 312 |
| None | 8 16 | 110 | | |
| Streptomycin, 10 | 8 68 | 118 | | |
| Streptomycin, 50 | 8 16 | 13 | 68 | 135* |
| Streptomycin, 100 | 15 22 | 133 | 140 | |
| Quinacrine Hydrochloride, 20 | 13 21 | 106 | | |
| Quinacrine Hydrochloride, 50 | 31 15 | 96 | | |
| Quinacrine Hydrochloride, 100 | 16 28 | 114 | | |
| Streptomycin, 100 and Quinacrine Hydrochloride, 20 | 4 9 | 5 | 62 | 90 |
| Streptomycin, 100 and Quinacrine Hydrochloride, 50 | 7 13 | 5 | | 14 |
| Streptomycin, 10 and Quinacrine Hydrochloride, 100 | 3 61 | 112 | | |
| Streptomycin, 50 and Quinacrine Hydrochloride, 100 | 17 22 | 18 | | 26 |

*Reading 118 at 187 hours.

EXAMPLE 7

Table 6 demonstrates that staphylococcal strains which have already become resistant to streptomycin can be destroyed by the combination of 50 micrograms per milliliter of sulfathiazole and 100 micrograms per milliliter of quinacrine hydrochloride.

TABLE 6

Prevention of the Emergence of Sulfathiazole-Resistant Staphylococci by quinacrine hydrochloride.

Inoculum: ca 50 cells/5 ml of salts-glucose case in hydrolyzate medium.

| Growth System Additions numbers in micrograms per milliliter | Sensitive strain (3A) Growth turbidity readings at hours of: | | | | | | Strain resistant to 1000 micrograms per milliliter of Streptomycin | | | | |
|---|---|---|---|---|---|---|---|---|---|---|---|
| | 0 | 18 | 42 | 71 | 137 | 160 | 0 | 18 | 42 | 71 | 137 | 160 |
| None | 1 | 188 | 252 | — | — | — | 7 | 204 | 254 | — | — | — |
| Sulfathiazole, 50 | 11 | 34 | 240 | — | — | — | 5 | 29 | 224 | — | — | — |
| Sulfathiazole, 100 | 3 | 11 | 42 | 135 | 198 | — | 2 | 13 | 52 | 210 | 210 | — |
| Quinacrine Hydrochloride, 100 | 0 | 0 | 160 | 168 | | | | 174 | — | 1 | 4/170 | 171 | 171 | — |
| Sulfathiazole, 50 and Quinacrine Hydrochloride, 100 | 10 | 13 | 11 | 11 | 16 | 16 | 2 | 4 | 3 | 3 | 10 | 14 |
| Sulfathiazole, 100 and Quinacrine Hydrochloride, 100 | 8 | 9 | 10 | 8 | 16 | 16 | 1 | 3 | 2 | 2 | 9 | 12 |
| Sulfathiazole, 5 and Quinacrine Hydrochloride, 50 | 0 | 0 | 0 | 0 | 3 | 7 | 0 | 1 | 13 | 92 | 180 | — |
| Sulfathiazole, 10 and Quinacrine Hydrochloride, 50 | 0 | 0 | 0 | 0 | 2 | 4 | 0 | 1 | 1 | 0 | 6 | 7 |
| Sulfathiazole, 1 and Quinacrine Hydrochloride, 100 | 1 | 2 | 2 | 2 | 8 | 13 | 0 | 2 | 1 | 1 | 8 | 11 |
| Sulfathiazole, 5 and Quinacrine Hydrochloride, 100 | 6 | 7 | 7 | 7 | 17 | 21 | 2 | 2 | 2 | 2 | 10 | 13 |
| Sulfathiazole, 10 and Quinacrine Hydrochloride, 100 | 1 | 1 | 1 | 1 | 11 | 11 | 2 | 2 | 2 | 2 | 9 | 13 |

EXAMPLE 8

Table 7 demonstrates that *Escherichia coli* strains which have already become resistant to streptomycin can be destroyed by the combination of 10 micrograms per milliliter of sulfathiazole and 50 micrograms per milliliter of quinacrine hydrochloride.

TABLE 7

Prevention of the Emergence of Sulfathiazole-Resistant strains of *Escherichia coli* by Quinacrine Hydrochloride.

Inoculum: ca 1 × 10⁶ cells/5 ml of salts-glucose-casein hydrolyzate medium.

| Growth System Additions numbers in micrograms per milliliter | Sensitive strain (B) Growth turbidity readings at hours of: | | | | | | Strain resistant to 1000 micrograms per milliliter of Streptomycin | | | | | |
|---|---|---|---|---|---|---|---|---|---|---|---|---|
| | 0 | 18 | 42 | 71 | 137 | 160 | 0 | 18 | 42 | 71 | 137 | 160 |
| None | 10 | 161 | 197 | — | — | — | 4 | 160 | 144 | — | — | — |
| Sulfathiazole, 5 | 1 | 85 | 140 | — | — | — | 4 | 160 | 124 | — | — | — |
| Sulfathiazole, | 5 | 6 | 16 | 98 | 300 | — | 13 | 20 | 172 | — | — | — |
| Sulfathiazole, 10 | 4 | 8 | 7 | 6 | 134 | 157 | 8 | 12 | 15 | 112 | 222 | — |
| Quinacrine Hydrochloride, 50 | 9 | 113 | 174 | — | — | — | 8 | 105 | 127 | — | — | — |
| Quinacrine Hydrochloride, 100 | 2 | 61 | 184 | — | — | — | 0 | 0 | 17 | 87 | 154 | — |

EXAMPLE 9

Table 8 demonstrates the effectiveness of various bactericidal agents in combination with quinacrine hydrochloride in the staphylococci. of the emergence of resistant strains of staphlococci.

TABLE 8

Prevention of the Emergence of Novobiocin, Erythromycin and Tetracycline-Resistant Strains of Staphylococci by Quinacrine Hydrochloride.

Inoculum: ca 1 × 10⁸ cells/5 ml salts-glucose-casein hydrolyzate medium.

| Growth System Additions numbers in micrograms per milliliter | Growth Turbidity Readings at Hours of: | | | | | |
|---|---|---|---|---|---|---|
| | 0 | 22 | 46 | 118 | 148 | 168 |
| None | 8 | 282 | 285 | 280 | — | — |
| Quinacrine Hydrochloride, 50 | 3 | 225 | 220 | 195 | — | — |
| Quinacrine Hydrochloride, 100 | 8 | 216 | 220 | 215 | — | — |
| Novobiocin, 5 | 7 | 14 | 20 | 214 | — | — |
| Novobiocin, 5 and Quinacrine Hydrochloride, 50 | 7 | 13 | 20 | 45 | 162 | 173 |
| Novobiocin, 5 and Quinacrine Hydrochloride, 100 | 9 | 18 | 28 | 27 | 25 | 24 |
| Erythromycin, 2.5 | 12 | 20 | 75 | 225 | — | — |
| Erythromycin, 5.0 | 2 | 16 | 13 | 226 | — | — |
| Erythromycin, 2.5 and Quinacrine Hydrochloride, 50 | 3 | 19 | 19 | 27 | 202 | — |
| Erythromycin, 5.0 and Quinacrine Hydrochloride, 50 | 2 | 11 | 13 | 17 | 16 | 20 |
| Erythromycin, 2.5 and Quinacrine Hydrochloride, 100 | 2 | 9 | 10 | 17 | 20 | 22 |
| Erythromycin, 5.0 and Quinacrine Hydrochloride, 100 | 5 | 20 | 30 | 30 | 32 | 30 |

| Growth System Additions numbers in micrograms per milliliter | Growth Turbidity Readings at Hours of: | | | | | |
|---|---|---|---|---|---|---|
| | 0 | 18 | 43 | 65 | 145 | 209 |
| Tetracycline, 1 | 5 | 18 | 16 | 16 | 235 | — |
| Tetracycline, 2.5 | 3 | 16 | 18 | 18 | 21 | 250 |
| Tetracycline, 1 and Quinacrine Hydrochloride, 80 | 0 | 13 | 8 | 8 | 18 | 193 |
| Tetracycline, 2.5 and Quinacrine. Hydrochloride, 80 | 0 | 12 | 14 | 16 | 25 | 33 |
| Tetracycline, 1 and Quinacrine Hydrochloride, 160 | 2 | 16 | 20 | 17 | 20 | 27 |
| Tetracycline, 2.5 and Quinacrine Hydrochloride, 160 | 3 | 15 | 21 | 20 | 26 | 30 |

In accordance with an embodiment of my invention, it has been found that the phenothiazine tranquilizers, such as chlorpromazine, promethazine and levomeprazine, and the antidepressants, such as 3-chloro-dibenzocycloheptene, cyclobenzaprine, protriptyline, amitriptyline, desipramine and imipramine are effective in preventing the emergence of resistant strains of *Staphylococcus aureus* and *Escherichia coli* in the presence of bactericidal agents. By comparison, the antimalarials, such as chloroquine and hydroxychloroquine were found to be relatively ineffective in preventing such emergence. Moreover, the active compounds by themselves do not exercise a bactericidal action at what would normally amount to effective concentrations, and as stated heretofore, the action is not synergistic.

The nomenclature and formulas of these antimutagenic compositions follows:

TABLE 9

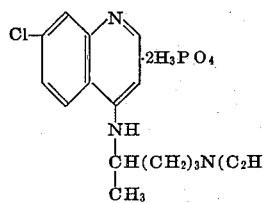

Chloroquine Diphosphate; 7-Chloro-4-(diethylamino-1-methylbutylamino)quinoline diphosphate.

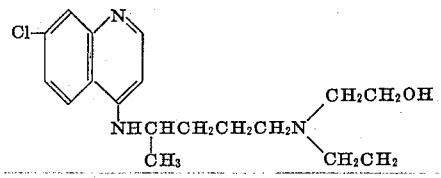

Hydroxychloroquine; 7-chloro-4-[4-ethyl(2-hydroxyethyl)amino]-1-methylbutylamino)quinoline.

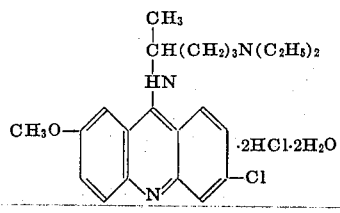

Quinacrine Hydrochloride; 3-Chloro-7-methoxy-9-(1-methyl-4-diethylaminobutylamino)acridinedihydrochloride.

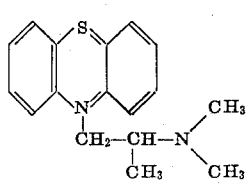

Promethagine; 10-Dimethylaminopropyl)phrenothiazine.

Levomepromazine; 2-methoxy-10-(22-methyl-3-dimethylaminopropyl)phenothazine.

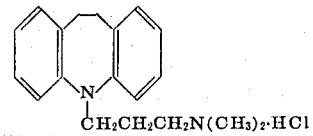

Imipramine; 5-(2-Dimethylaminopropyl)-10 10, -dihydro-5H-dibenz(b,f)azepine hydrochloride.

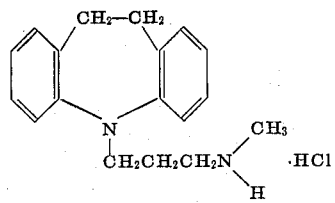

Desipramine; 5-(3-methylaminopropyl)-10,11-dihydro-5H-dibenz-(b,f)azepine hydrochloride.

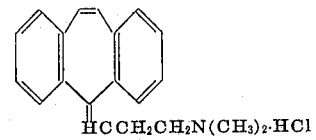

Cyclobenzaprine; N,N-Dimethyl-5H-dibenzo[a,d]-cycloheptene-Δ5,-propylamine hydrochloride.

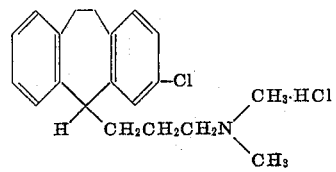

3-Chloro-10,11-dihydro-N,N-dimethyl-5H-dibenzo[a,d]-cycloheptene-5-proplyamine hydrochloride.

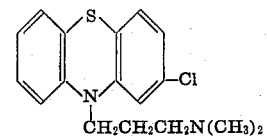

Chlorpromazine; 2-Chloro-10-(3-dimethylaminopropyl)-phenothiazine.

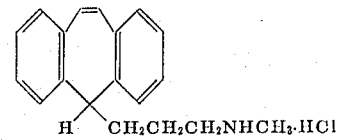

Protriptyline; N-Methyl-5H-dibenzo[a,d]-cycloheptene-5-propylamine hydrochloride.

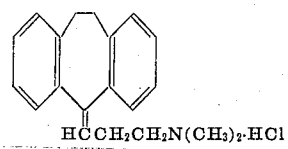

HCCH₂CH₂N(CH₃)₂·HCl

Amitriptyline; 5-(3-Dimethylaminopropylidene)-dibenzo-[a,d][1,4]-cycloheptadiene hydrochloride.

Each of the compounds identified in Table 9 was paired with either streptomycin, chloromycetin, or sulfathiazole, and the combined chemotherapeutic agents were tested for their effectiveness in preventing the emergence of drug-resistant strains of two organisms, i.e., *Staphylococcus aureus* and *Escherichia coli*. The specific organisms used in the following examples were *Staphylococcus aureus* (3528, ATCC) and *Escherichia coli* (B). Nutrient broth containing 0.5 percent glucose was used for overnight cultures. For making the analyses shown in the examples, the salts-glucose-casein-hydrolyzate medium was used. One liter of the medium contained 10 g. casein hydrolyzate, 10 g. phosphate, 1.7 g. NaCl, 0.07 g. MgSO₄·7H₂O, 0.19 g. (NH₄)PO₄, 5 g. glucose, 20 mg. tryptophane, 1 mg. nicotinamide, 1 mg. thiamine. For colony count, plating was carried out on nutrient agar. For the preparation of inoculum it is necessary to have a fresh slant to be used for the innoculation of the overnight glucose-broth cultures. This is centrifuged, washed with and suspended in M/30 phosphate buffer of pH 7.35 and diluted appropriately to obtain the desired inoculum according to the standard curve. The solutions of antibiotics are sterilized by passing through a sterilizing filter. Colony counts were made in accordance with standard procedures. All test systems containing the phenothiazine-type tranquilizers were shielded by aluminum foil against light.

PREVENTION OF THE EMERGENCE OF DRUG-RESISTANT STRAINS FROM THE SENSITIVE POPULATION OF *STAPHYLOCOCCUS AUREUS* (3528) BY TRANQUILIZERS IN COMBINATION WITH A DRUG

| Growth system (additions μg./ml.) | Growth turbidity readings at hours of— | | | | | | | Terminal test for surviving cells* |
|---|---|---|---|---|---|---|---|---|
| | 0 | 20 | 42 | 66 | 115 | 139 | 163–234 | |
| 1. Control | 4 | 255 | 276 | 294 | | | | |
| 2. Sulfathiazole, 50–100 | 21 | | | 238 | | | | |
| 3. Streptomycin, 30–50 | 9 | 12 | 14 | | 117 | 238 | | |
| 4. Chloromycetin, 5–10 | 7 | 53 | 157 | 162 | | | | |
| 5. Chlorpromazine, 30 | 12 | 28 | 58 | 122 | 205 | | | |
| 6. Promethazine, 100 | 5 | 37 | 58 | 85 | 160 | | | |
| 7. Levomeprazine 100 | 5 | 14 | 40 | 115 | 171 | | | |
| 8. Sulfathiazole, 100 plus chlorpromazine, 30 | 14 | | | 17 | 17 | 17 | 17 | None. |
| 9. Sulfathiazole, 50 plus promethazine, 100 | 8 | | | 22 | 21 | 21 | 21 | Do. |
| 10. Sulfathiazole, 100 plus levomeprazine, 100 | 5 | | | 2 | 3 | 3 | 7 | Do. |
| 11. Streptomycin, 30 plus chlorpromazine 30 | 2 | 4 | 8 | | 5 | 3 | 3 | Do. |
| 12. Streptomycin, 30 plus promethazine, 75 | 1 | 4 | 6 | | 6 | 7 | 9 | Do. |
| 13. Streptomycin, 50 plus levomeprazine, 100 | 4 | 6 | 7 | | 4 | 4 | 6 | Do. |
| 14. Chloromycetin, 10 plus chlorpromazine, 30 | 11 | 15 | 15 | 15 | | 15 | 15 | Do. |
| 15. Chloromycetin, 5 plus promethazine, 75 | 4 | 8 | 8 | 8 | | 8 | 12 | Do. |
| 16. Chloromycetin, 5 plus levomeprazine, 100 | 15 | 17 | 17 | 17 | | 17 | 17 | Do. |
| 17. Chloromycetin, 75 plus levomeprazine, 80 | 5 | 7 | 7 | 7 | | 7 | 8 | Do. |

*0.2 ml. of the growth system spread out on nutrient agar plate.

NOTE.—Medium: Salts-glucose-casein hydrolysate medium with 1% phosphate pH 7.35. Inoculum: 1×10⁶ cells/5 ml. medium containing sulfathiazole and 1×10³ cells/5 ml. medium containing streptomycin or chloromycetin.

EXAMPLE 11

Failure of certain tranquilizers to prevent the growth of *Staphylococcus aureus* (3528) resistant to 1,000 μg. of streptomycin/ml.

| Growth system (additions μg./ml.) | Growth turbidity readings at hours of— | | | | | |
|---|---|---|---|---|---|---|
| | 0 | 67 | 91 | 115 | 139 | 163 |
| 1. Control | 2 | 220 | | | | |
| 2. Streptomycin, 1,000 | 4 | 226 | | | | |
| 3. Chlorpromazine, 30 | 7 | 190 | 180 | | | |
| 4. Streptomycin 1,000 plus chlorpromazine, 30 | 6 | 60 | 195 | | | |
| 5. Promethazine 75, 100 | 4 | 142 | 150 | | | |
| 6. Streptomycin, 1,000 plus promethazine, 100 | 3 | 48 | 85 | 140 | 150 | |
| 7. Levomeprazine, 120 | 3 | 23 | 55 | 98 | 150 | |
| 8. Streptomycin, 1,000 plus levomeprazine, 120 | 3 | 5 | 12 | 40 | 77 | 185 |

EXAMPLE 12

Prevention of the emergence of drug-resistant strains of *Staphylococcus aureus* (3528) by certain antidepressants

| Growth systems* (additions μo./ml.) | Growth turbidity readings at hours of— | | | | | | | Surviving cells** |
|---|---|---|---|---|---|---|---|---|
| | 0 | 18 | 42 | 67 | 90 | 114 | 138 | 210 | |
| 1. Control | 18 | 190 | 258 | | | | | | |
| 2. Cyclobenzaprine, 75 | 10 | 22 | 30 | 180 | | | | | |
| 3. 3-chloro-cycloheptene, 20, 30 | 5 | 31 | 39 | 185 | | | | | |
| 4. Protriptyline, 50 | 5 | 23 | 72 | 199 | | | | | |
| 5. Amitriptyline, 75 | 5 | 23 | 35 | 220 | | | | | |
| 6. Imipramine, 100 | 10 | 30 | 85 | 150 | 172 | 190 | | | |
| 7. Azepine hydrochloride*** | 10 | 26 | 85 | 165 | | 185 | | | |
| 8. Streptomycin, 30 | 6 | 14 | 175 | 258 | | | | | |
| 9. Streptomycin, 30 plus cyclobenzaprine, 75 | 3 | 3 | 5 | 6 | | | 7 | 7 | None. |
| 10. Streptomycin, 30 plus 3-chlorocycloheptene, 30 | 12 | 15 | 15 | 16 | | | 16 | | Do. |
| 11. Streptomycin, 30 plus protriptyline, 50 | 7 | 7 | 8 | 8 | | | 10 | | Do. |
| 12. Streptomycin, 30 plus amitriptyline, 75 | 10 | 10 | 12 | 12 | | | 12 | 12 | Do. |
| 13. Streptomycin, 30 plus imipramine, 100 | 4 | 6 | 7 | 7 | | | 7 | | Do. |
| 14. Streptomycin, 30 plus azepine hydrochloride, 75*** | 3 | 7 | 7 | 7 | | | 10 | | Do. |

EXAMPLE 12—Continued

Prevention of the emergence of drug-resistant strains of *Staphylococcus aureus* (3528) by certain antidepressants

| Growth systems* (additions μo./ml.) | Growth turbidity readings at hours of— | | | | | | | Surviving cells** |
|---|---|---|---|---|---|---|---|---|
| | 0 | 18 | 42 | 67 | 90 | 114 | 138 | 210 | |
| 15. Sulfathiazole, 50 | 6 | 30 | | | 204 | | | | |
| 16. Sulfathiazole, 50 plus cyclobenzaprine, 75 | 0 | 0 | | | 2 | 2 | 2 | 2 | Do. |
| 17. Sulfathiazole, 50 plus 3-chloro-cycloheptene, 20 | 2 | 2 | | | 2 | 2 | 2 | | Do. |
| 18. Sulfathiazole, 50 plus protriptyline, 50 | 0 | 0 | | | 0 | 0 | 0 | | Do. |
| 19. Sulfathiazole, 50 plus amitriptyline, 75 | 0 | 0 | | | 2 | 2 | 2 | | Do. |
| 20. Sulfathiazole, 50 plus imipramine, 100 | 13 | 13 | | | 13 | 13 | 13 | | Do. |
| 21. Sulfathiazole, 50 plus azepine hydrochloride*** | 14 | 14 | | | 14 | 15 | 15 | | Do. |

*Growth medium consisted of 1% casein hydrolyzate, 0.5% glucose, 1% phosphate pH 7.35 and salts. Inoculum, $1.0 \times 10^5$ cells/5 ml. in streptomycin and $1.0 \times 10^6$ cells/5 ml. in sulfathiazole growth systems.
**The presence or absence of surviving cells was determined by inoculating 0.2 ml. of test systems into 5 ml. of glucose broth and 0.2 ml. onto the nutrient agar plate.
***Azepine hydrochloride is 10,11-dihydro-5-(3-methyaminopropyl)-5H-dibenz(b,f) azepine hydrochloride.

EXAMPLE 13

Prevention of the emergence of drug-resistant strains of *Escherechia coli* by certain antidepressants

| Growth systems* (additions μg./ml.) | Growth turbidity reading at hours of— | | | | | | | Surviving cells |
|---|---|---|---|---|---|---|---|---|
| | 0 | 19 | 42 | 66 | 92 | 115 | 139 | 186 | |
| 1. Control | 0 | 190 | 254 | 300 | | | 445 | | |
| 2. Sulfathiazole, 2 | 8 | 13 | 135 | 210 | | | 445 | | |
| 3. Sulfathiazole, 4 | 0 | 0 | 2 | 13 | | | 360 | | |
| 4. 3-chloro-dibenzocycloheptene, 50, 75 | 7 | 95 | | 270 | 360 | | | | |
| 5. Cyclobenzaprine, 75 | 5 | 35 | | 320 | 372 | | | | |
| 6. Protriptyline, 50 | 8 | 25 | 210 | 355 | 370 | | | | |
| 7. Amitriptyline, 75, 100 | 0 | 21 | | 330 | 375 | | | | |
| 8. Azepine hydrochloride, 50 | 6 | 105 | | 250 | | | 360 | | |
| 9. Azepine hydrochloride, 75 | 4 | | | 74 | 85 | 96 | 105 | | |
| 10. Imipramine, 75, 100 | 0 | 122 | 185 | 292 | 355 | | 385 | | |
| 11. Sulfathiazole, 4 plus atabrine, 100 | 6 | 6 | 6 | 8 | | | 12 | 15 | None. |
| 12. Sulfathiazole, 2 plus 3-chloro-dibenzocycloheptene, 75 | 0 | | | 0 | 0 | 2 | 4 | 4 | Do. |
| 13. Sulfathiazole, 4 plus cyclobenzaprine, 75 | 0 | | | 0 | 0 | 0 | 0 | 1 | Do. |
| 14. Sulfathiazole, 4 plus protriptyline, 50 | 17 | | | 17 | 17 | 18 | 18 | 18 | Do. |
| 15. Sulfathiazole, 2 plus amitriptyline, 100 | 12 | | | 12 | 12 | 13 | 13 | 13 | Do. |
| 16. Sulfathiazole, 2 plus azepine hydrochloride, 75 | 0 | 0 | 0 | 0 | | | 0 | 1 | Do. |
| 17. Sulfathiazole, 4 plus imipramine, 75 | 0 | 0 | 0 | 0 | | | 0 | 2 | |
| 18. Streptomycin, 7.5 plus atabrine 150 | 7 | 7 | | | 9 | 12 | 15 | 18 | Do. |
| 19. Streptomycin, 7.5 plus 3-chlorodibenzocycloheptene, 50 | 6 | 6 | | | 6 | 8 | 10 | 10 | Do. |
| 20. Streptomycin, 7.5 plus cyclobenzaprine, 75 | 5 | 5 | | | 5 | 5 | 5 | | Do. |
| 21. Streptomycin, 5 plus protriptyline, 50 | 8 | 10 | 10 | | 10 | 10 | 10 | 10 | Do. |
| 22. Streptomycin, 7.5 plus amitriptyline, 75 | 10 | 10 | | | 10 | 10 | 10 | 10 | Do. |
| 23. Streptomycin, 5 plus azepine hydrochloride, 75 | 5 | | | 7 | 7 | 7 | 7 | 7 | Do. |
| 24. Streptomycin, 5 plus imipramine 100 | 12 | | | 12 | 12 | 13 | 16 | | Do. |

*Inoculum, $1 \times 10^5$ cells/5 ml. salts-glucose casein hydrolyzate medium containing 1% phosphate of pH 7.35.

EXAMPLE 14

Growth of *S. aureus* (3528) by plate count in the presence of 3-chloro-dibenzocycloheptene amitriptyline or azepine hydrochloride

| System (μg./ml.) | Cells/ml. at hours of— | | | | | | |
|---|---|---|---|---|---|---|---|
| | 0 | 1 | 3 | 5 | 7 | 24 | 49 |
| (1) Control | $1.39 \times 10^7$ | $1.36 \times 10^7$ | $2.31 \times 10^7$ | $4.05 \times 10^7$ | $9.1 \times 10^7$ | $9.65 \times 10^8$ | $2.9 \times 10^7$ |
| (2) 3-chloro.* compound, 30 | $1.23 \times 10^7$ | $1.1 \times 10^7$ | $0.71 \times 10^7$ | $1.29 \times 10^7$ | $1.14 \times 10^7$ | $2.3 \times 10^7$ | $6.35 \times 10^7$ |
| (3) Amitriptyline, 75 | $1.32 \times 10^7$ | $0.55 \times 10^7$ | $1.07 \times 10^7$ | $1.47 \times 10^7$ | $1.78 \times 10^7$ | $2.8 \times 10^7$ | $1.62 \times 10^8$ |
| (4) Azepine hydrochloride, 75 | $1.2 \times 10^7$ | $0.7 \times 10^7$ | $1.1 \times 10^7$ | $0.97 \times 10^7$ | $1.34 \times 10^7$ | $4.8 \times 10^7$ | $1.78 \times 10^8$ |

*3-chlorocycloheptene, 30.

NOTE.—Medium, Salts-glucose-casein hydrolyzate with 1% phosphate of pH 7.35.

Examples 10, 12 and 13 show that certain phenothiazine tranquilizers, such as chlorpromazine, promethazine, or levomepromazine, the antidepressant amitriptyline and its derivatives, imipramine, and its derivative azepine hydrochloride, when used in combination with a bactericidal agent selected from the class consisting of sulfathiazole, streptomycin, and chloromycetin, prevented the mergence of *Staphylococcus aureus* (3528) and *Escherichia coli* (B) strains resistant to any one of these drugs, used. In their absence, drug-resistant strains emerged. In the presence of any one of the disclosed chemotherapeutic agents alone, at the concentrations used, the normal strains grew, following a period of delayed growth. The results presented in Example 11 showed that the phenothiazine tranquilizers were incapable of preventing the growth of streptomycin-resistant Staphylococci in the presence of streptomycin. Results, not reported here, showed that in contrast to the phenothiazine tranquilizers and the disclosed antidepressants, the anti-malarial chloroquines, derivatives of quinoline, in identical test systems are ineffective to prevent the emergence of *Escherichia coli* and *Staphylococcus aureus* strains resistant to all three drugs used individually. Furthermore, chloroquine in as high a concentration as 2,500 mg./ml. does not inhibit growth and failed to prevent the emergence of *Escherichia coli* strains resistant to streptomycin. On the other hand, as herein described, certain antidepressants and certain tranquilizers prevented the emergence of the strains of both bacterial species resistant to the drugs used.

Having thus described may invention, I claim:

1. In a method of killing bacteria by the action of a bactericidal agent selected from the class consisting of sulfathiazole, chloromycetin, streptomycin, penicillin, erythromycin, tetracycline, chloramphenicol and novobiocin, which bacteria normally develop strains resistant to the activity of said bactericidal agent, the step which comprises physically contacting bacteria which has not developed a resistant strain to said bactericidal agent with (1) said bactericidal agent and (2) an amount of the antimutagenic agent quincrine hydrochloride effective to prevent said bacteria from developing a resistant strain to said bactericidal agent.

2. A composition for killing bacteria by physical contact therewith consisting essentially of (1) an effective amount of a bactericidal component selected from the class consisting of sulfathiazole, chloromycetin, streptomycin, penicillin, erythromycin, tetracycline, chloramphenicol and novobiocin, and (2) an amount in the range of 20–200 micrograms of quinacrine hydrochloride, in sterile aqueous solution.

3. A composition for killing bacteria by physical contact, comprising a sterile aqueous solution of about 10–100 micrograms per milliliter or streptomycin and about 20–200 micrograms per milliliter of quinacrine hydrochloride.

4. A composition for killing bacteria by physical contact, comprising a sterile aqueous solution of about 0.01–1.0 unit of penicillin per milliliter and about 20–200 micrograms per milliliter of quinacrine hydrochloride.

5. A composition for killing bacteria by physical contact comprising a sterile aqueous solution of about 0.1–10 micrograms per milliliter of novobiocin and about 20–200 micrograms per milliliter of quinacrine hydrochloride.

6. A composition for killing bacteria by physical contact comprising a sterile aqueous solution of about 0.1–10.0 micrograms per milliliter of erythromycin and about 20–200 micrograms per milliliter of quinacrine hydrochloride.

7. A composition for killing bacteria by physical contact comprising a sterile aqueous solution of about 0.1–10.0 micrograms per milliliter of tetracycline and about 20–200 micrograms per milliliter of quinacrine hydrochloride.

8. A composition for killing bacteria by physical contact comprising a sterile aqueous solution of about 0.1–10 micrograms per milliliter of chloramphenicol and about 20–200 micrograms per milliliter of quinacrine hydrochloride.

9. A composition for killing bacteria by physical contact comprising a sterile aqueous solution of about 0.1–100 micrograms per milliliter of sulfathiazole and about 20–200 micrograms per milliliter of quinacrine hydrochloride.

* * * * *